United States Patent [19]
Ondris et al.

[11] Patent Number: 4,990,765
[45] Date of Patent: Feb. 5, 1991

[54] METHOD AND MEANS FOR PROCESSING AN ANALOG SIGNAL FROM A DIODE ARRAY

[75] Inventors: Miroslav Ondris; Allen A. Endres, both of Chagrin Falls, Ohio

[73] Assignee: Stemcor Corporation, Cleveland, Ohio

[21] Appl. No.: 440,779

[22] Filed: Nov. 22, 1989

[51] Int. Cl.⁵ ............................................. H01J 40/14
[52] U.S. Cl. ................................... 250/208.2; 307/311
[58] Field of Search ........................... 250/208.2, 208.3; 307/311

[56] References Cited

U.S. PATENT DOCUMENTS 3,432,670  3/1969  Dym et al. .
3,448,275  6/1969  Hall et al. .
3,984,677  10/1976  Hosoe et al. ..................... 250/208.2
4,565,928  1/1986  Yamamoto et al. ............. 250/208.2
4,785,191  11/1988  Ondris et al. .

OTHER PUBLICATIONS

Horton et al.; "The Scanistor—A Solid-State Image Scanner;" *Proceedings of the IEEE*; Dec. 1964; pp. 1513-1528.

*Primary Examiner*—David C. Nelms
*Attorney, Agent, or Firm*—Pearne, Gordon, McCoy & Granger

[57] ABSTRACT

A method and means for the electronic processing of an analog signal generated in a series addressed diode array to produce a digital signal indicative of the illumination of the photodiodes in the array is disclosed. A voltage ramp is applied to the array and the resulting current steps converted to a voltage signal. The voltage signal is differentiated and the resulting pulses are digitized to provide the illumination state of the photodiodes in the array. Alternately, the voltage signal is integrated in a series of windows. The results of each previous integration is substrated from the most current integration, producing a series of pulses that are digitized to provide the illumination state of the array. The processing may be synchronized by either dividing the sweep interval into evenly spaced intervals, by differentiating the voltage signal and detecting the derivative exceeding a threshold, or differentiating the voltage signal twice and detecting zero-crossings in the resulting signal. The voltage ramp may be made to increase in slope with time to help ensure that the addressing diodes begin conducting at equal time intervals.

24 Claims, 4 Drawing Sheets

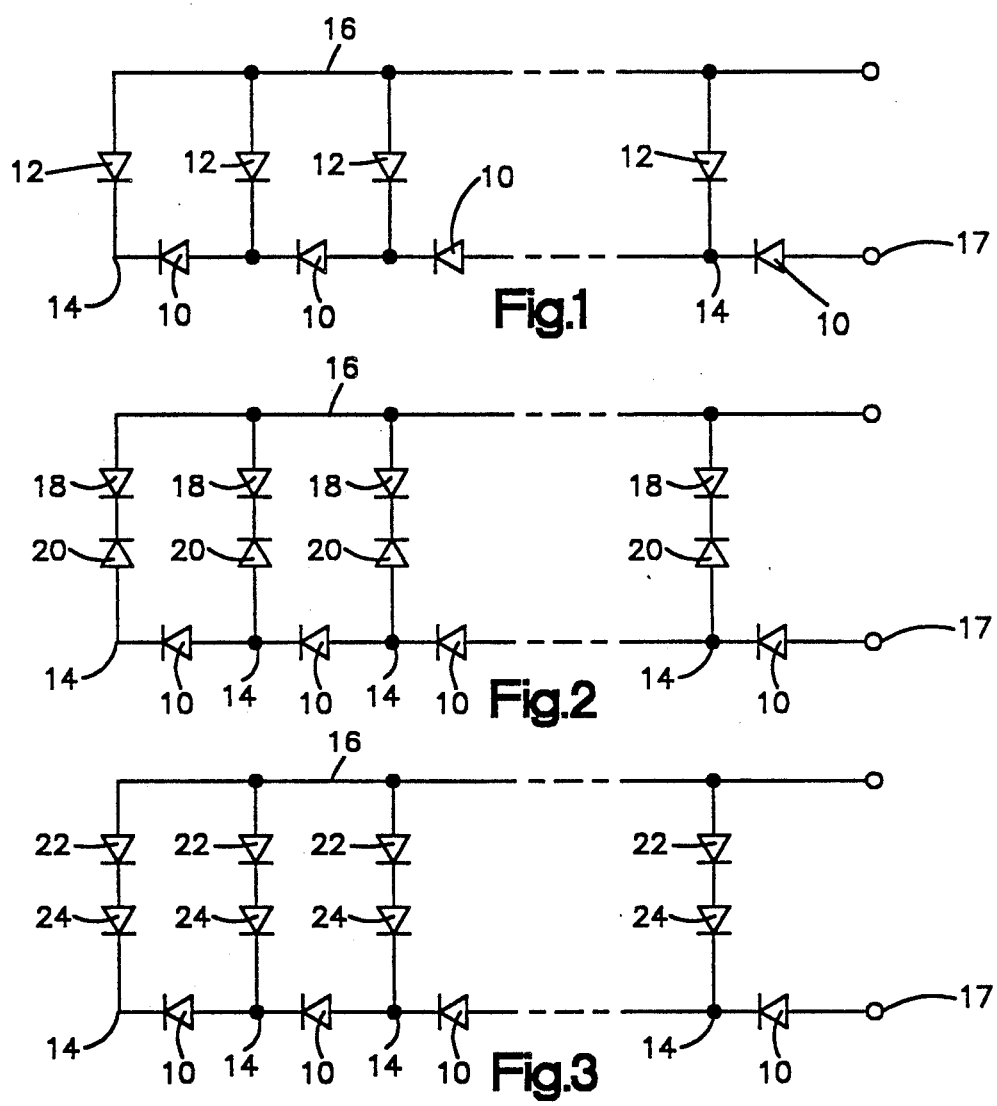
Fig.1
Fig.2
Fig.3
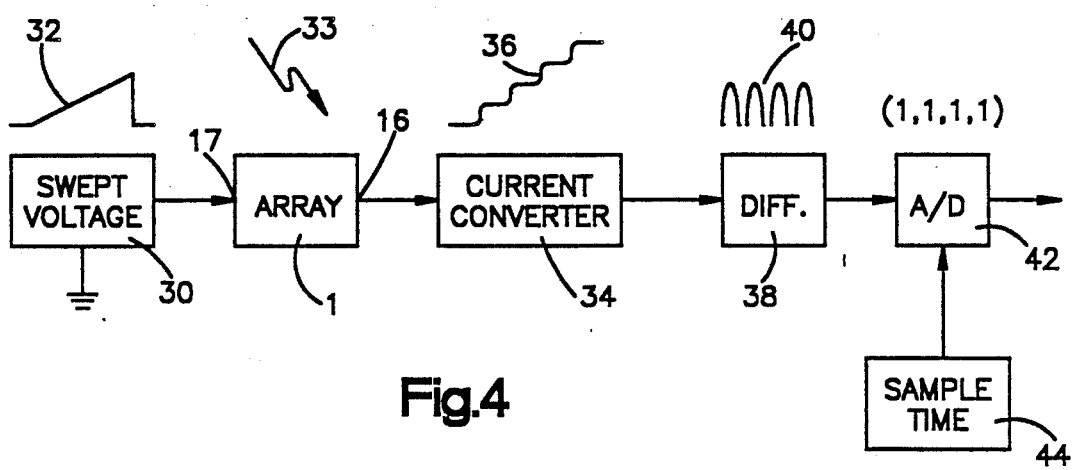
Fig.4

METHOD AND MEANS FOR PROCESSING AN ANALOG SIGNAL FROM A DIODE ARRAY

BACKGROUND OF THE INVENTION

This invention relates to the electronic processing of an analog signal generated in a diode array to produce a digital signal indicative of the illumination of the photodiodes in the array.

U.S. Pat. No. 3,432,670 shows a prior art diode array for sensing the illumination thereof. The array consists of ladder rungs each composed of an opposed addressing diode and a photodiode with series resistors connecting the rungs at one side. The other side of the ladder provides a terminus for the rungs.

A bias voltage is applied in series with the resistors which act as a voltage divider. In order to scan the array, a ramp voltage is applied between the resistors and the terminus. As the voltage at each rung becomes sufficient to overcome the divided bias voltage and forward bias each successive addressing diode, the respective photodiode is interrogated. Depending on the illumination of the photodiode, an amount of current flows therethrough to the terminus. This current is sensed and differentiated to provide a pulse train indicative of the illumination state of the array.

For each conducting photodiode in the array, a current flows through one or more of the series resistors. This current has the effect of changing the voltages established along the divider. This in turn can affect the identification of the photodiode being interrogated, as the respective point in time of forward bias changes. It is because of this that the bias voltage is necessary. The bias voltage needs to be high enough so that the effect of changes in interrogation times due to photodiode conduction/non-conduction do not produce ambiguous identification of the photodiode being interrogated. This requires the bias current to be substantially higher than the maximum current due to illuminated photodiodes.

U.S. Pat. No. 4,785,191 discloses diode arrays without a resistive voltage divider and is included herein in its entirety by reference. In these arrays, the addressing diodes form a series voltage dividing network. FIGS. 1-3 herein show three configurations of this type array.

In FIG. 1, addressing diodes 10 are connected in series and photodiodes 12 are connected in general to the connections or unions 14 between the addressing diodes 10. The opposite end of the photodiodes are connected to a common terminus 16. The polarity of the devices may be as shown or all inverted from what is shown.

The photodiodes 12 may be interogated by applying a voltage ramp to the terminus 16 and the terminal 17. For the diode polarities shown, the positive going side of the ramp would be applied to the terminal 17. As the threshold potential of each successive addressing diode 10 is reached a current will be able to flow through the respective photodiode 12 if it is illuminated. Thus there will be a current step for each illuminated diode and no step (or a much smaller step) for each dark diode.

Referring to FIG. 2, a similar array is shown wherein the photodiodes 12 are replaced by photoresponsive elements made up of a photodiode 18 and a non-photoresponsive diode 20. Once again, the polarities of the devices may all be inverted. In addition, the order of the diodes 18, 20 may be interchanged.

Similarly, the array of FIG. 3 has the photodiodes 12 of FIG. 1 replaced by double series photodiodes 22, 24.

The number of photodiodes or photoresponsive elements, "n", in the arrays may be, for example, sixteen.

The voltage across a resistor is a linear function of the current. In an array having a resistive voltage divider, this accounts for the relatively large change in potentials along the voltage divider in response to currents through the photodiodes. This voltage shift is such that techniques such as bias voltages and/or additional circuitry, such as means to directly sense the state of the addressing diodes, are necessary to determine the point in time when each addressing diode is forwardly biased. U.S. Pat. No. 3,448,275 shows one such approach.

In arrays having series addressing diodes which act as a series diode voltage divider as well (e.g. FIGS. 1-3), the potentials along the addressing diodes are a logarithmic function of the current. As a result, the change in potentials in response to differing photodiode illumination patterns is much smaller than in those with resistors. This permits a much simpler method and circuit to be used to determine the illumination state of the array.

SUMMARY OF THE INVENTION

The methodes and circuits according to the invention for processing the analog signal produced by a diode array having series connected addressing diodes are simpler and easier to implement than those of the prior art. No complicated techniques for synchronizing the interrogation of each photoresponsive element with respect to the ramp voltage is needed.

A swept voltage is applied between the series of addressing diodes and the common terminus of "n" photo responsive elements. The voltage results in a current that is indicative of the illumination state of each of the photoresponsive elements in the array.

This current is next converted to a proportional voltage signal.

This first signal is then differentiated to produce a second signal.

The second signal is then sampled at "n" times during the voltage sweep to provide "n" amplitude values.

Each of these "n" amplitude values are then digitized, the values representing the illumination state of the array.

This method works particularly well in the case where the digitization is of only one bit resolution. This is the case where the only information desired is whether each photoresponsive element is "light" or "dark." While it is possible to use this method for multiple bit resolution (i.e. gray scale information), another embodiment of the invention provides better results for gray scale applications.

An embodiment of the invention that is superior for gray scale detection starts similarly but employs integration during successive time windows during a sweep and the subtraction of the previous window's integration value from that of the current window.

A swept voltage is applied between the series of addressing diodes and the common terminus of "n" photo responsive elements. The voltage results in a current that is indicative of the illumination state of each of the photoresponsive elements in the array.

This current is next converted to a proportional voltage signal.

This first signal is then integrated during "n" successive time windows to provide a value for each window.

The previous window value is then subtracted from each window value to provide a set of "n" result values.

Each of these result values are then digitized, the values representing the illumination state of the array.

In both of these embodiments, the swept voltage may be a linear ramp or it may be more complicated waveform to improve the time linearity of the point in time each photoresponsive element is addressed.

The selection of the "n" times at which samples are taken (i.e. synchronization) may be accomplished in three ways. The first is to simply establish "n" equally-spaced times relative to the time required for a voltage sweep, the times being roughly centered on the interval between each addressing diode becoming conductive as the voltage sweep increases.

If more precision synchronization is required, a differentiated form of the first signal may be compared to a threshold and the "n" sample times established from the points where the threshold is exceeded.

If still more precision is required, the first signal may be differentiated twice and the "n" sample times established from the zero crossing points of the resulting signal.

The conversion of the input current to a voltage signal may be accomplished by a novel stage in the circuit comprising an op-amp with the feedback resistor connected, not directly to the output of the op-amp, but to a voltage divider across the output. This provides an improved signal-to-noise ratio plus minimizes high frequency noise.

In applications where minimizing the part count is important, the input current may be converted by a source-follower bi-polar transistor or, alternately, a load resistor across the input of a source-follower FET.

BRIEF DESCRIPTION OF THE DRAWINGS

FIG. 1 is a schematic drawing of a series diode addressed array.

FIG. 2 is a schematic drawing of another embodiment of a series diode addressed array.

FIG. 3 is a schematic drawing of still another embodiment of a series diode addressed array.

FIG. 4 is a block diagram of one embodiment of the invention.

DESCRIPTION OF THE PREFERRED EMBODIMENTS

Figure 5:
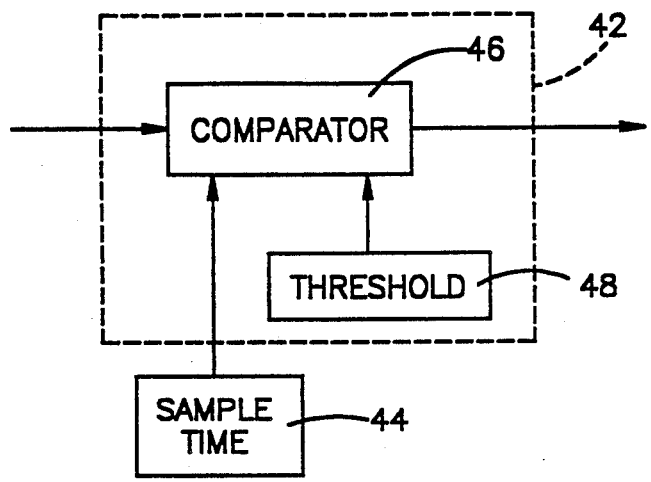
FIG. 5 is a block diagram of one embodiment of the analog-to-digital converter of the invention.

Referrng to FIG. 4, a signal processing circuit according to the invention is shown. A swept voltage 30 is applied in series with a diode array 1. The array 1 has series-connected addressing diodes such as those shown in FIGS. 1-3. The addressing diodes may be thought of as one side of a ladder and the photoresponsive elements as the rungs. An exemplary voltage ramp 32 of voltage versus time is shown above the swept voltage 30.

The array 1 is illuminated by light 33. The current resulting from the swept voltage 30 and the light 33 is converted to a voltage in a current-to-voltage converter 31. A current/voltage step occurs for each illuminated photoresponsive element. An exemplary waveform 36 of current/voltage versus time is shown above the converter 34 (the exemplary waveforms are shown positive-going for convenience). In this example, all of the photoresponsive elements are illuminated.

The voltage signal from the converter 34 is differentiated by a differentiator 38. This results in a pulse for each step (change in slope) in the current/voltage. An exemplary waveform 40 is shown above the differentiator 38.

The output of the differentiator 38 is applied to an analog-to-digital converter 42. The output of the convertor 42 is a series of digital values representing the illumination state of the array 1. The times at which the output of the differentiator 38 is sampled and digitized are controlled by a sample time generator 44.

Referring to FIG. 5, a single-bit resolution form of the converter 42 is shown. At times determined by the sample time genertor 44, a comparator 46 compares the output of the differentiator 38 to a threshold value 48. If the differentiator output is above the threshold, one value, for example, a binary one is provided at the output of the comparator. Similarly, if the differentiator output is below the threshold, another value, for example a binary zero is provided.

It is of course possible to digitize the differentiator output with higher resolution, as the current/voltage steps and the resulting differentiator output vary in slope/amplitude according to the intensity of the illumination on each photoresponsive element of the array. In this way gray scale information may be provided.

Figure 6:
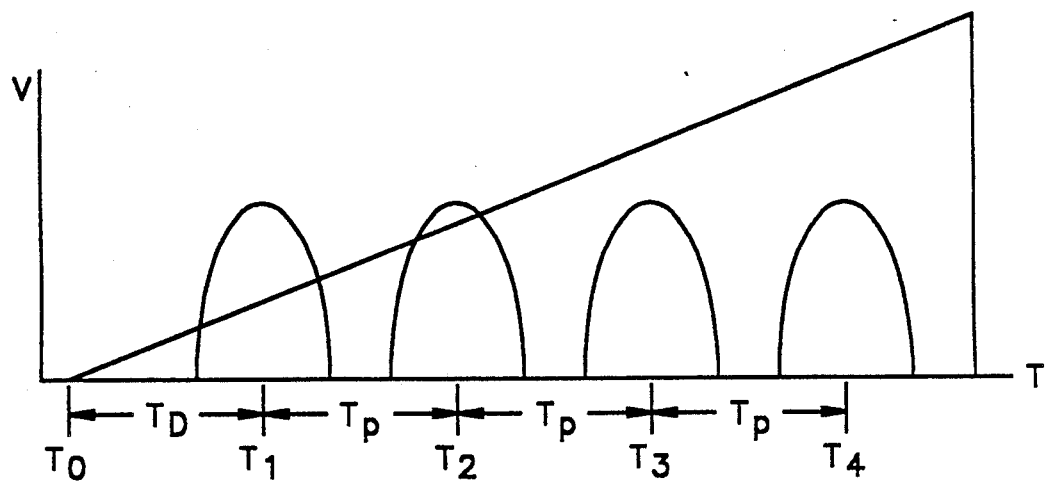
FIG. 6 is a graph illustrating one embodiment of the sample time generator of the invention.

FIG. 6 illustrates the simplest means of implementing the sample time genertor 44 for an array 1 having only four photoresponsive elements.

The exemplary voltage ramp 32 is shown superimposed over the exemplary differentiator output 40. The ramp begins at time $T_0$. A delay $T_D$ is provided to allow transients to subside. The times $T_1$, $T_2$, $T_3$ and $T_4$ at which the output of the differentiator is sampled and digitized are chosen time $T_P$ apart. The value $T_P$ is chosen such that the sample times are nominally within the expected pulses from the differentiator. The sample time generator 44 then simply provides instructions to the converter 42 to digitize the differentiator output at the fixed times $T_1$, $T_2$, $T_3$ and $T_4$ after time $T_0$.

This method is simple and minimizes hardware, but is susceptible to error as the number of photoresponsive elements increase, as the positions of the output pulses from the differentiator 38 change depending on how many of or how brightly the photoresponsive elements are illuminated.

Figure 7:
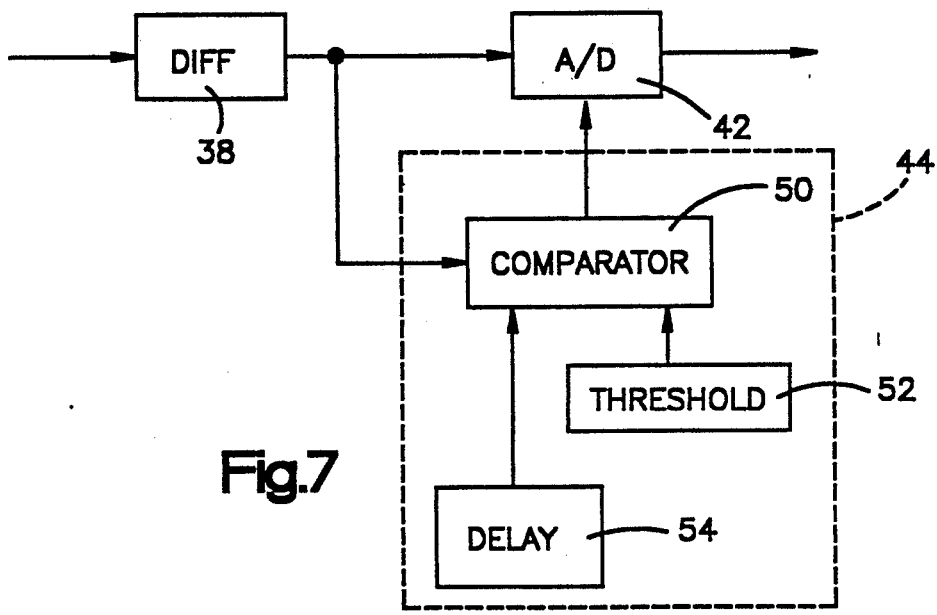
FIG. 7 is a block diagram of another embodiment of the sample time generator of the invention.

A more accurate, but more hardware intensive method of implementing the sample time generator 44 is shown in FIG. 7.

The output of the differentiator 38 is applied to a comparator 50 which compares the instantaneous value thereof to a threshold value 52. When the threshold is exceeded, the converter 42 is instructed to digitize the output of the differentiator 38.

A delay 54 may be advantageously added to the sample time generator 44. The delay 54 allows transients to subside before the comparator 50 begins to look for values above the threshold 52.

The threshold 52 is chosen to be above the noise in the system but to still reliably detect the beginning of a pulse. This is reasonably easy for single-bit resolution, but presents problems if gray scale is desired. The use of this method removes most errors produced by the pulse position moving due to differing illumination patterns of the array.

Figure 8:
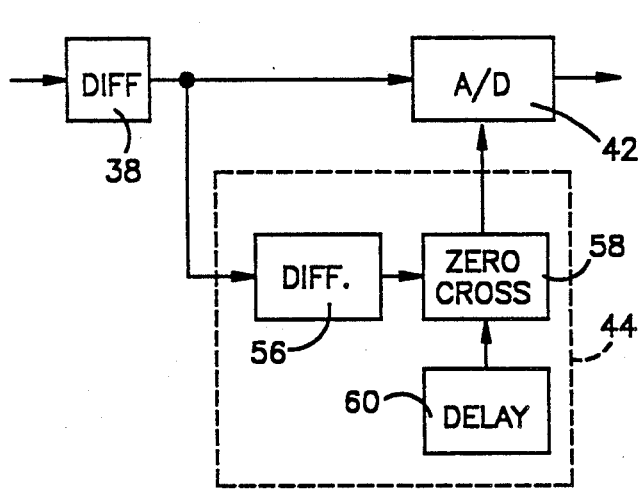
FIG. 8 is a block diagram of still another embodiment of the sample time generator of the invention.

For the most reliable detection of the center of the pulses from the differentiator 38, but at the cost of additional circuitry, the method of FIG. 8 may be employed.

The output of the differentiator 38 is applied to an additional differentiator 56. The output of the differentiator 56 is then applied to a zero-crossing detector 58. The detector 58 instructs the converter 42 to digitize the output of the differentiator 38 when a zero crossing is detected. In this way, the highest point on each pulse is detected. This resuslts in better performance for the detection of gray scale information, as the sample is taken at the peak rather than some other value.

A delay 60 may be advantageously added to the sample time generator 44. The delay 54 allows the circuitry to charge before the detector 58 begins to function.

Figure 9:
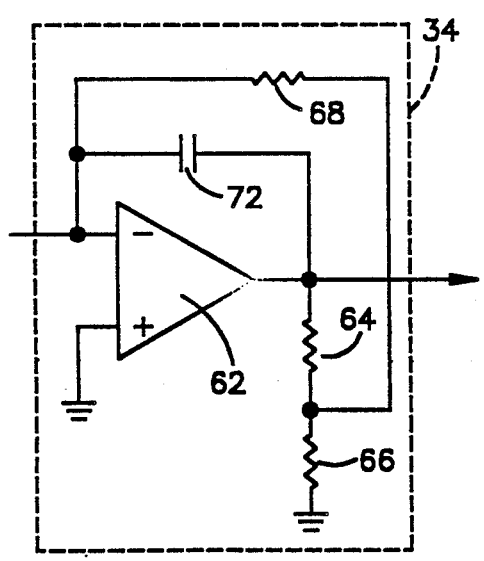
FIG. 9 is a schematic drawing of one embodiment of the current-to-voltage converter of the invention.

FIG. 9 shows one embodiment of the current-to-voltage converter 34.

The inverting input of an op-amp 62 is connected to the array 1 and the non-inverting input to ground. The output of the op-amp 62 is connected to the differentiator 38 and through the resistive voltage divider network of resistors 64 and 66 to ground.

The feedback resistor 68 is connected between the inverting input of the op-amp 62 and the tap 70 between resistors 64 and 66. Also, feedback capacitor 72 is connected between the inverting input and the output of the op-amp 62.

By connecting the feedback resistor 68 to the tap 70 instead of the output of the op-amp 62, as is usual, the signal-to-noise ratio of the circuit is improved.

This connection gives the op-amp gain greater than unity. The output voltage that is normally input current times the feedback resistor value is now input current times the divider ratio times the feedback resistor. Thus, for example, for a feedback resistor 68 of 50K ohms and a divider ratio of 20 (resistor 64/resistor 66) the output voltage will be the same as if resistor 68 had been 1M ohm.

The lower input impedance due to the lower value of the feedback resistor reduces noise at the input (and the output). Also, the frequency response of the op-amp 62 is reduced, thus eliminating high frequency noise without detrimental effects on the data signal. In addition, the size of the feedback capacitor 72 is reduced, which increases the high frequency response.

Figure 10:
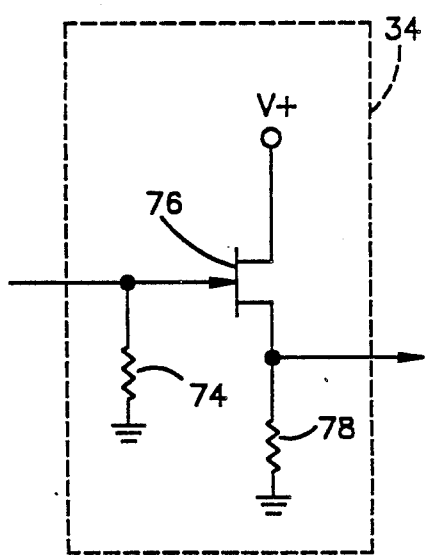
FIG. 10 is a schematic drawing of another embodiment of the current voltage converter of the invention.

In applications where the number of circuit elements is to be minimized, the embodiment of the current-to-voltage converter 34 shown in FIG. 10 is desirable.

The load resistor 74 is connected between the array 1 and ground. In addition, the array is connected to the gate of a field-effect transistor 76. The source of the FET is connected to a positive supply voltage and the drain through a resistor 78 to ground. The drain is also connected to the differentiator 38.

The resistors 74, 78 may be, for example, be 220K ohms and 10K ohms, respectively.

In operation, the current through the array 1, passes through the resistor 74, producing a voltage at the gate of FET 76. Acting as a source follower, the FET causes the voltage to then appears across the resistor 78. The resistor 78 is large so that the voltage signal across it is large. This signal then has a high impedance and little current capability. The FET buffers the voltage with a gain of unity and adds a large current capability.

Figure 11:
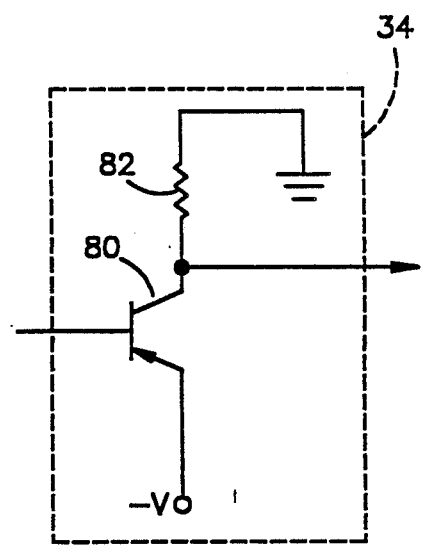
FIG. 11 is a schematic drawing of still another embodiment of the current-to-voltage converter of the invention.

To further minimize the number of components, the embodiment of current-to-voltage converter 34 of FIG. 11 may be employed.

The array 1 is connected to the base of a bi-polar PNP transistor and the collector to a negative voltage supply. The emitter of the transistor 80 is connected through a resistor 82 to ground. In addition, the emitter is connected to the differentiator 38.

In operation, the current from the array 1 flows through the base of the transistor 80 producing a voltage across the resistor 82 in an emitter-follower configuration. While not having the high input impedance of the circuit of FIG. 10, one less resistor is used.

Figure 12:
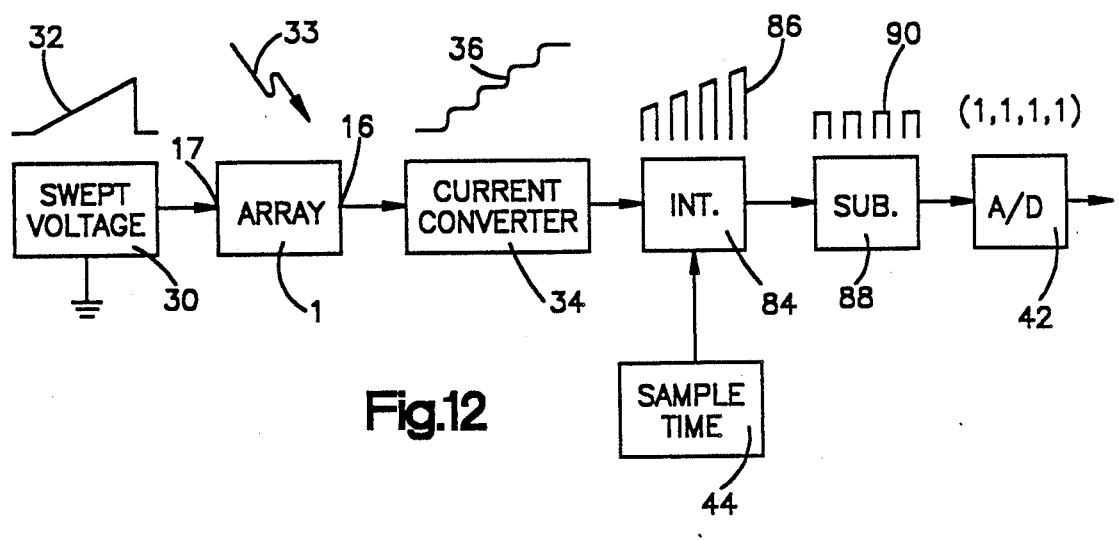
FIG. 12 is a block diagram of another embodiment of the invention.

Referring to FIG. 12, an additional embodiment of a signal processing circuit according to the invention is shown.

Similar to the embodiment of FIG. 4, a swept voltage 30 is applied to the array 1 and the resulting current converted to a voltage by the current-to-voltage converter 34.

The output of the converter 34 is then integrated by integrator 84 during a series of time windows established by the sample time generator 44.

The beginning of each window is initiated by the generator 44 in a manner similar to that described above for the embodiment of FIG. 4. As described above, generator 44 may simply contain equally spaced times relative to the commencement of the voltage sweep, a differentiator with a threshold detector, or a double differentiator with a zero-crossing detector.

The length of each time window initiated by the sample time generator 44 is less than the time between sample times. For example, the length of each integration time window may be two-thirds of the expected time between sample times.

An exemplary waveform 86 of the output of the integrator 84 with respect to time is shown above the integrator 84. Each integration during a window contains not only the integration of the desired signal, but also that of the noise and parasitic signals in the array 1.

The output of the integrator 84 is applied to a sequential subtractor 88. The subtracter 88 subtracts the integrated value for the previous time window from the most current integration value (zero may be subtracted from the first value). The integration followed by subtraction has the effect of smoothing and cancelling the effect of much of the noise and parasitic signals in the system.

The output of the subtracter 88 is then digitized by the analog-to-digital converter 42. While the converter 42 may be a one-bit resolution converter similar to that shown in FIG. 5, a multi-bit resolution converter may be advantageously employed.

While more complicated than the embodiment of FIG. 4, the embodiment of FIG. 12 provides superior rejection of noise and parasitic signals. This makes the measurement of gray scale information contained in the current from the array more reliable and thus the use of multi-bit resolution converters desirable.

It should be noted that it is possible to eliminate the current-to-voltage converter 34 and instead to integrate the current from the array 1 directly.

While for many applications, the sawtooth voltage ramp 32 may be adequate, improved system performance can be achieved by using a different waveform.

Figure 13:
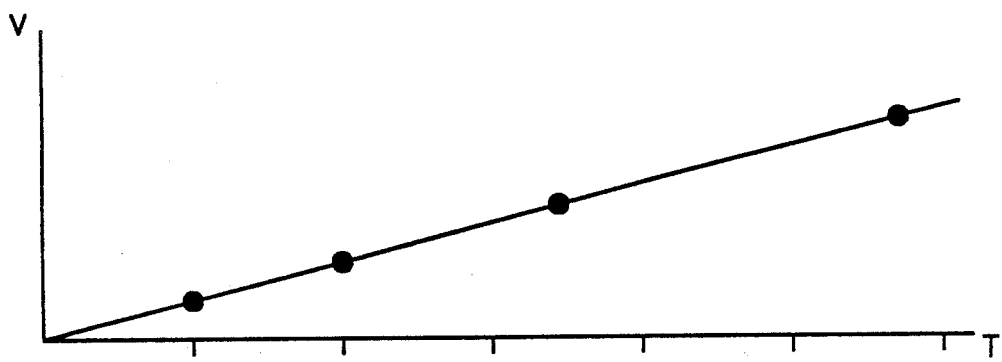
FIG. 13 is a graph illustrating the non-uniform time spacing of the addressing diode switch points with a linear voltage ramp.

Referring to FIG. 13, a voltage ramp is shown with points 92, 94, 96 and 98 at which the first four addressing diodes, respectively, begin conduction. As the number of diodes addressed goes up, so does the voltage required to do so. This is due to the additional voltage drop across the series resistance of the diodes as their number increases and to the leakage currents in the array. The points 92, 94, 96 and 98 therefore become spaced farther apart in time (this is exaggerated in FIG. 13). This complicates the processing circuitry if the spacing becomes too irregular.

Figure 14:
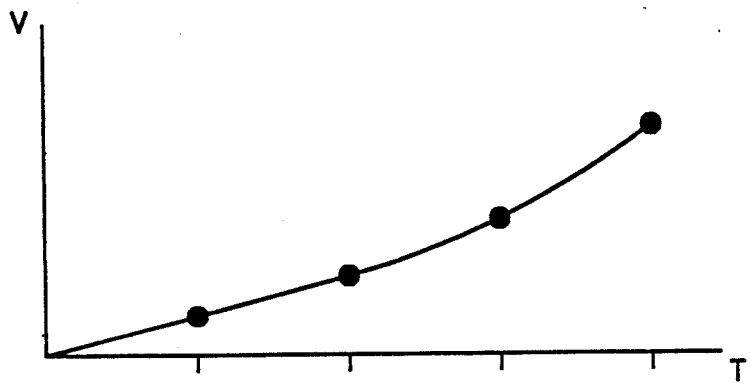
FIG. 14 is a graph illustrating the uniform time spacintg of the addressing diode switch points with a voltage ramp that increases in slope with time.

Referring to FIG. 14, a non-linear voltage ramp is shown with points 92', 94', 96' and 98' at which the first four addressing diodes, respectively, begin conduction. While the voltages at which conduction begins remains the same (once again exaggerated), the use of a waveform whose slope increases with time can be made to result in the points 92', 94', 96' and 98' being equally spaced in time. This is particularly useful for the sample time generator illustrated in FIG. 6.

It is of course possible to time-multiplex the circuits of FIGS. 4 and 12, where successive arrays 1 are switched into place for each sweep of the voltage. In this way a single set of electronics can be used for several arrays.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for determining an illumination state of an "n"-point photodiode array having a plurality of addressing diodes, a plurality of unions, said unions connecting said addressing diodes in series relationship, and "n" photoresponsive means each having two terminals, one of said terminals each being connected to successive unions and the other being connected to a terminus, said method comprising:
    applying a swept voltage between said series of addressing diodes and said terminus thereby producing a current in series relationship with said voltage;
    converting said current to a first signal proportional in amplitude thereto;
    differentiating said first signal to provide a second signal;
    sampling the amplitude of said second signal at each of "n" times during the voltage sweep to provide "n" amplitude values; and
    converting each of said amplitude values to a digital value, wherein said digital values represent the illumination state of said "n"-point photo diode array.

2. A method according to claim 1, wherein said amplitude converting step comprises:
    comparing each of said amplitude values to a threshold value; and
    providing a first binary value for each of said amplitude values over the threshold value and a second binary value for each of said amplitude values under the threshold value, wherein said binary values represent the illumination state of said "n"-point photodiode array.

3. A method according to claim 1, wherein said swept voltage is a substantially linear function with respect to time.

4. A method according to claim 1, wherein said swept voltage increases in slope with respect to time.

5. A method according to claim 1, further comprising delaying a fixed time after the start of the voltage sweep before said differentiating step.

6. A method according to claim 1, wherein said "n" times have a substantially equal time between them.

7. A method according to claim 1, further comprising:
    differentiating said second signal to provide a third signal; and
    establishing each of said "n" times in response to a change in polarity of said third signal.

8. A method according to claim 1, further comprising:
    comparing said second signal to a threshold value; and
    establishing each of said "n" times in response to said second signal being greater than said threshold.

9. A method for determining an illumination state of an "n"-point photodiode array having a plurality of addressing diodes, a plurality of unions, said unions connecting said addressing diodes in series relationship, and "n" photoresponsive means each having two terminals, one of said terminals each being connected to successive unions and the other being connected to a common terminus, said method comprising:
    applying a swept voltage between said series of addressing diodes and said terminus thereby producing a current in series relationship with said voltage;
    converting said current to a first signal proportional thereto;
    integrating said first signal during "n" successive time windows to provide a value for each window;
    subtracting from each window value the value from the previous window to provide a set of "n" result values; and
    converting each of said result values to a digital value, wherein said digital values represent the illumination state of said "n"-point photodiode array.

10. A method according to claim 9, wherein said result value converting step comprises:
    comparing each of said result values to a threshold value; and
    providing a first binary value for each of said result values over the threshold value and a second binary value for each of said result values under the threshold value, wherein said binary values represent the illumination state of said "n"-point photodiode array.

11. A method according to claim 9, wherein said swept voltage is a substantially linear function with respect to time.

12. A method according to claim 9, wherein said swept voltage increases in slope with respect to time.

13. A method according to claim 9, further comprising delaying a fixed time after the start of the voltage sweep before the integrating step.

14. A method according to claim 9, wherein said "n" windows have a substantially equal time between them.

15. A method according to claim 9, further comprising:
differentiating twice said first signal to provide a second signal; and
establishing each of said "n" windows in response to a change in polarity of said second signal.

16. A method according to claim 9, further comprising:
differentiating said first signal to provide a second signal;
comparing said second signal to a threshold value; and
establishing each of said "n" windows in response to said second signal being greater than said threshold.

17. A circuit for determining an illumination state of an "n"-point photodiode array having a plurality of addressing diodes, a plurality of unions, said unions connecting said addressing diodes in series relationship, and "n" photoresponsive means each having two terminals, one of said terminals each being connected to successive unions and the other being connected to a common terminus, said circuit comprising:
means for applying a swept voltage between said series of addressing diodes and said terminus thereby producing a current in series relationship with said voltage;
means for converting said current to a first signal proportional in amplitude thereto;
means for differentiating said first signal to provide a second signal;
means for sampling the amplitude of said second signal at each of "n" times during the voltage sweep to provide "n" amplitude values; and
means for converting each of said amplitude values to a digital value, wherein said digital values represent the illumination state of said "n"-point photo diode array.

18. A circuit according to claim 17, wherein said current converting means comprises:
an op-amp having an input, an output, and an inverting input, said inputs being connected in series relationship with said swept voltage and addressing diodes;
a resistive network connected between said output and said input, said network having an intermediate tap; and
a feedback resistor connected between said inverting input and said tap, wherein said first signal is produced at said output.

19. A circuit according to claim 17, wherein said current converting means comprises:
a first resistor connected in series relationship with said swept voltage and addressing diodes;
a field-effect transistor having a source, a drain and a gate, said gate connected to one terminal of said first resistor, and
a second resistor connected at one terminal to said drain and at the other terminal to the other terminal of said first resistor, wherein said first signal is produced at said drain.

20. A circuit according to claim 17, wherein said current converting means comprises:
a bipolar transistor having a base, an emitter and a collector, said base receiving said current; and
a resistor connected at one terminal to said emitter and the other terminal providing a return path for said current, wherein said first signal is produced at said emitter.

21. A circuit for determining an illumination state of an "n"-point photodiode array having a plurality of addressing diodes, a plurality of unions, said unions connecting said addressing diodes in series relationship, and "n" photoresponsive means each having two terminals, one of said terminals each being connected to successive unions and the other being connected to a common terminus, said circuit comprising:
means for applying a swept voltage between said series of addressing diodes and said terminus thereby producing a current in series relationship with said voltage;
means for converting said current to a first signal proportional in amplitude thereto;
means for integrating said first signal during "n" successive time windows to provide a value for each window;
means for subtracting from each window value the value from the previous window to provide a set of "n" result values; and
means for converting each of said result values to a digital value, wherein said digital values represent the illumination state of said "n"-point photodiode array.

22. A circuit according to claim 21, wherein said current converting means comprises:
an op-amp having an input, an output, and an inverting input, said inputs being connected in series relationship with said swept voltage and addressing diodes;
a resistive network connected between said output and said input, said network having an intermediate tap; and
a feedback resistor connected between said inverting input and said tap, wherein said first signal is produced at said output.

23. A circuit according to claim 21, wherein said current converting means comprises:
a first resistor connected in series relationship with said swept voltage and addressing diodes;
a field-effect transistor having a source, a drain and a gate, said gate connected to one terminal of said first resistor, and
a second resistor connected at one terminal to said drain and at the other terminal to the other terminal of said first resistor, wherein said first signal is produced at said drain.

24. A circuit according to claim 21, wherein said current converting means comprises:
a bipolar transistor having a base, an emitter and a collector, said base receiving said current; and
a resistor connected at one terminal to said emitter and the other terminal providing a return path for said current, wherein said first signal is produced at said emitter.

* * * * *